Feb. 23, 1971 J. P. VINDING 3,566,315

STRIP LINE ELECTRICAL FILTER ELEMENT

Filed Dec. 29, 1967

INVENTOR.
JORGEN P. VINDING
BY George C. Sullivan
Agent 3,566,315

STRIP LINE ELECTRICAL FILTER ELEMENT

Jorgen P. Vinding, Monte Sereno, Calif., assignor to Lockheed Aircraft Corporation, Burbank, Calif.

Filed Dec. 29, 1967, Ser. No. 694,555
Int. Cl. H03h 7/02
U.S. Cl. 333—73 2 Claims

ABSTRACT OF THE DISCLOSURE

This invention is directed to an improved strip line electrical filter. The quarter wave resonator disclosed is fan-shaped which simplifies defining the point of junction to the transmission line.

BACKGROUND OF THE INVENTION

This invention relates to a microwave filter, and particularly to the type of filter utilizing distributed constant resonators of the quarter wave length type arranged in strip transmission line construction and printed circuits.

Strip transmission line filters are known which comprise a plurality of resonator assemblies along a single transmission line where the complete assembly is disposed between two parallel conductive ground plates. The resonator assemblies usually include a resonator element having a length which is substantially one-fourth of the wave length of the mid frequency of a desired pass band or stop band. Often the length of the conductor connecting the resonator assemblies is approximately one-quarter wavelength or approximately one-half wavelength at the same frequency. One of the problems resulting from this arrangement is that the point of junction between the resonator assemblies and the transmission line may be ill defined, causing undesired additional pass bands or "holes" in the stop band as well as undesirably increasing the attenuation of the filter in the pass band.

In the prior art strip transmission line filters of several types are well known. These include band pass filters known as comb line filters, and interdigital filters, as well as those consisting of coupled half wave resonators. They also include low pass filters consisting of a uniform line with uniform line shunt stubs, but for the reason given above these are usually restricted to the lowest microwave frequencies or they exhibit quite narrow stop bands.

The present invention, as well as being economical to fabricate, allows the junction of the line to the resonators assembly to be more precisely defined while maintaining the low impedance characteristic of the radial line stub.

Another object of the present invention is to provide a unique compact filter.

BRIEF DESCRIPTION OF THE DRAWINGS

Other objects and advantages of this invention will be readily appreciated and the same can be better understood by reference to the following detailed description when considered in connection with accompanying drawings, wherein.

Figure 1:
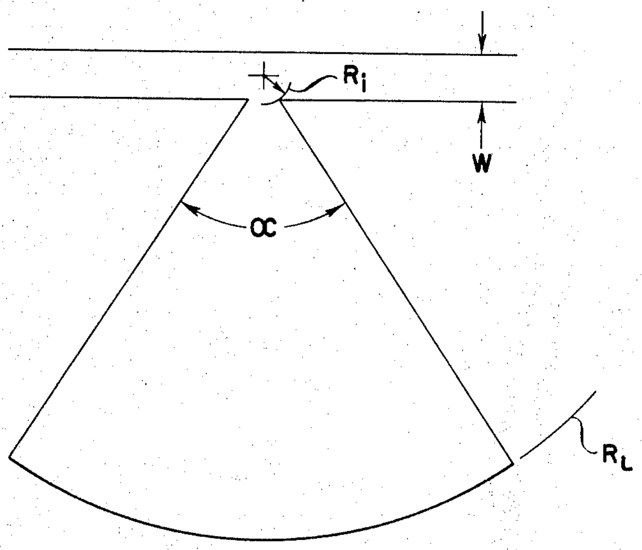
FIG. 1 is an illustration of a single radial tuning element utilized to optimize the critical factors.

In particular, FIG. 1 can be utilized to design a radial element for a desired frequency. A single radial element 1 defining an arc of angle $\alpha$ and having a radius $R_L$ is shown connected to a conductor 2. The points of contact of the sides 5 and 6 of angle $\alpha$ to conductor 2 are defined by $R_i$, where the intersection of sides 5 and 6 defines the center from which $R_i$ and $R_L$ are measured. This center is substantially equidistant from the sides of conductor 2.

Figure 2:
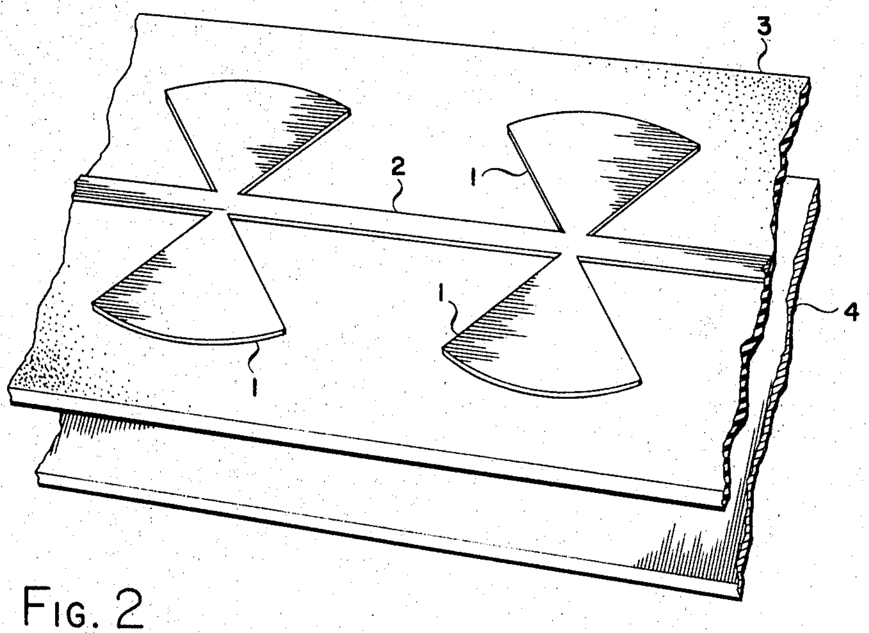
FIG. 2 is a perspective view of a strip line filter incorporating a plurality of radial tuning elements.

As an example of the application of the teaching of this invention the design of a strip transmission line low pass filter will be described:

The first step is to select a lumped constant prototype filter with the desired pass band, stop band, and cut-off characteristic according to any one of the commonly used filter design methods. This is then transformed into a strip transmission line circuit where series inductors are represented by short sections of uniform transmission line of length L and characteristic impedance $Z_u$, while the shunt capacitance is represented in part by the capacitance of the $\pi$-equivalent of the short uniform lines and in part by a radial line shunt stub. The stub may be single as shown in FIG. 1 or double as shown in FIG. 2.

The length and characteristic impedance of the uniform line must be chosen such that $$X_1 = Z_u \sin \frac{2\pi L}{\lambda}$$

where $X_1$ equals the reactance of the series inductor in the prototype filter at a frequency $f_1$ near the upper end of the pass band and $\lambda$ equals the wavelength of the uniform transmission line at frequency $f_1$. The selected length L then defines another frequency $f_2$ at which the uniform line is a half wavelength long. The width $w$ of the uniform line is determined by the selected value of $Z_u$, and by the thickness $d$ and relative dielectric constant $\epsilon_v$ of the substrate.

The first step in designing the radial shunt stub is selecting the radius $R_i$ that defines the junction point of the radial stub 1 to the conductor 2. The width of the conductor is defined as $w$. It has been found experimentally that $R_i$ can be defined by the following inequality:

$$w \geq R_i \geq \frac{w}{\sqrt{2}} \tag{1}$$

where $w$=the width of conductor 2.

$R_i$=the distance between the center of conductor 2 and the junction point of radial stub 1 to the conductor 2.

For convenience, $R_i$ can be set equal to $$\frac{w}{\sqrt{2}}$$

$R_L$ is then selected to make the radial stub resonant at the frequency $f_2$ where the length of the adjoining line is equivalent to a half wavelength. This is done by mathematically setting the input impedance equal to zero, where the input impedance of an open circuit stub in ordinary stripline with two ground planes is defined by the following equation:

$$Z_s = j\frac{dZ_o}{2\pi R_i} \frac{\cos(\theta_i - \psi_L)}{\sin(\psi_i - \psi_L)} \frac{180°}{\alpha} \tag{2}$$

where $Z_S$=input impedance of an open circuited stub.

$j=\sqrt{-1}$.

$d$=thickness of the stubstrate.

$$Z_o = \frac{120\pi}{\sqrt{\epsilon_r}} \sqrt{\frac{J_o^2(kR_L)+N_o^2(kR_i)}{J_1^2(kR_i)+N_1^2(kR_i)}}$$

$R_i$=same as defined in inequality (1) above and can be set equal to $$\frac{w}{\sqrt{2}}$$

$$k = \frac{2\pi}{\lambda}$$

$\alpha$=angle defined by the two sides of the radial stub as as shown in FIG. 1.

$$\theta_i = \tan^{-1}\left[\frac{N_o(kR_i)}{J_o(kR_i)}\right] \qquad (3)$$

$$\psi_L = \tan^{-1}\left[\frac{J_1(kR_L)}{-N_1(kR_L)}\right] \qquad (4)$$

$$\psi_i = \tan^{-1}\left[\frac{J_1(kR_i)}{-N_1(kR_i)}\right] \qquad (5)$$

and where:

$w$=the width of conductor 2.
$\epsilon_r$=the relative dielectric constant of the substrate.
$J_o$=Bessel function of order zero, first kind.
$N_o$=Bessel function of order zero, second kind.
$J_1$=Bessel function of order one, first kind.
$N_1$=Bessel function of order one, second kind.

See "Fields and Waves in Modern Radio" by S. Ramo and J. R. Whinnery, second edition, John Wiley & Sons, Inc., New York.

The input impedance can be set equal to zero by setting:

$$\cos[\theta_i - \psi_L] = 0 \qquad (6)$$

where these symbols are defined above following Equation 2. It is obvious this can be done by letting:

$$\theta_i - \psi_L = 90° + p(180°) \qquad (7)$$

where: $p$=any integer or zero.

Since $R_i$ has already been defined by Equation 1, Equation 3 can be solved for $\theta_i$. The value of $\theta_i$ can then be inserted in Equation 7, and this equation solved for $\psi_L$. When this value of $\psi_L$ is inserted into Equation 4, Equation 4 can be solved for $R_L$. In actual practice a graph of $\psi_L$ vs. $kR_L$, or a computer can be used to determine $R_L$.

The angle, $\alpha$, defined by the two sides of the radial stub can be found by using Equation 2 where.

$Z_S$=shunt impedance of the radial line stub required in the filter at the design frequency $f_1$ and Equations 3 to 5 inclusive are now evaluated at the same design frequency. If a double stub is used as shown in FIG. 2 the sum of the two angles must equal the value of $\alpha$ calculated above.

As an example of a strip line filter formed in accordance to the instant inventive feature, FIG. 2 illustrates a simple and direct method of utilizing the radial tuning element in a strip line filter. A plurality of radial tuning elements 1, are connected in pairs to a conductor 2, the length of conductor 2 between adjacent radial tuning elements being substantially equal to a half wavelength of the design frequency $f_2$. The radial tuning elements 1 and conductor 2 can be any suitable material but is preferably a deposited or etched type. Radial tuning elements 1 and conductor 2 are disposed on the substrate 3 such as polytetrafluoroethylene, fiberglass, or any other suitable dielectric material, and ground plane 4 is laid substantially juxtapositioned with the surface of the substrate 3. Ground plane 4 can be of any suitable material but is preferably a deposited type. Although a single ground plane is shown, it is understood that a second ground plane insulated from the circuit by a second substrate may be provided if desired without departing from the scope of this invention. It is understood that the radial tuning elements and conductors may be formed by photo-etching of conductive foil attached to the dielectric material or by printed circuit techniques or by any other well known means without departing from the scope of this invention. The conductor 2 can be connected to the circuit in which it will be used directly or by any other well known means (not shown).

Although two pairs of radial tuning elements are shown, it is understood that more or less elements may be utilized without departing from the spirit of this invention.

While we have shown and described and pointed out the fundamental novel features of the invention as applied to the preferred embodiment, it will be understood that various omissions and substitutions and changes in the form and details of the device illustrated may be made by those having ordinary skill in the art wtihout departing from the spirit of the invention. It is the invention, therefore, to be limited only as indicated by the scope of the following claims.

I claim:

1. A strip line electrical filter comprising:
a first dielectric support member,
an elongated conductor arranged on one surface of said first dielectric member,
at least two resonant members in spaced apart relationship with each other, each of which is in direct contact with said elongated conductor, said conductor constituting the only coupling between said members,
said resonate members being substantially fan shaped with their respective apical portions joining and emanating directly from said conductor with their sides diverging therefrom, wherein the radius thereof is R and the value ranges between W and $$\frac{W}{\sqrt{2}}$$

wherein W equals the width of the conductor and wherein the segment of the said conductor interconnecting said resonant members is subtsantially equivalent to a half wavelength of the design frequency of the filter,
and a first ground plane member disposed on a second surface of said first dielectric member parallel to said first surface.

2. A strip line electrical filter according to claim 1 including:
a second dielectric member secured over said elongated conductor, and
a second ground member secured to and disposed over said second dielectric member.

References Cited

UNITED STATES PATENTS

| | | | |
|---|---|---|---|
| 2,915,716 | 12/1959 | Hattersley | 333—73S |
| 3,451,015 | 6/1969 | Heath | 333—84M |
| 2,964,718 | 12/1960 | Packard | 333—73S |
| 3,417,352 | 12/1968 | Waller | 333—84M |

HERMAN KARL SAALBACH, Primary Examiner
C. BARAFF, Assistant Examiner

U.S. Cl. X.R.

333—84(M); 343—795